Patented Mar. 17, 1931

1,796,403

UNITED STATES PATENT OFFICE

GEORG SCHEUING AND BRUNO WALACH, OF NIEDER-INGELHEIM-ON-THE-RHINE, GERMANY, ASSIGNORS TO THE FIRM OF C. H. BOEHRINGER SOHN AKTIENGESELLSCHAFT, OF NIEDER-INGELHEIM-ON-THE-RHINE, GERMANY, A CORPORATION OF GERMANY

PROCESS OF MANUFACTURING 1,2,4-TRIAZOLES

No Drawing. Application filed October 28, 1929, Serial No. 403,113, and in Germany April 7, 1928.

The known process for preparing triazoles from hydrazidine and acid anhydrides (see, for example, Richter, Lehrbuch der anorganischen Chemie, 1913, Vol. II, page 817) has the disadvantage that the hydrazidines, particularly the aliphatic hydrazidines, are only obtainable with great difficulty and are also very unstable, so that this method of preparation has found no practical application.

According to this invention, 1,2,4-triazoles may be readily obtained by causing acyl hydrazines to react with imido compounds or with substances, which, under the conditions of the reaction, yield imido compounds, which may, on occasion, be unstable intermediate products incapable of being isolated.

In the said imido compounds of the type $$\begin{array}{c} R_1-C-X \\ \| \\ NR_2 \end{array}$$

$R_1$ and $R_2$ represent any radicals, for example carbon-containing radicals, which may also be connected together in a ring formation, whilst X represents any radical which is capable of mutually reacting with one of the hydrogen atoms of the acyl hydrazine— i. e. an ether group or acylated hydroxyl group, a halogen or the like.

Imido compounds of the aforementioned kind, such as imido esters of the type $$\begin{array}{c} R_1-C-OAc \\ \| \\ NR_2 \end{array}$$

or imido halogenides of the type $$\begin{array}{c} R_1-C-Cl \\ \| \\ NR_2 \end{array}$$

and the like, may for example, be obtained as intermediate products from esters of oximes by intramolecular conversion, for example according to the equation

or may be obtained from the oximes themselves by treating the same with acid halogenides, for example acid chlorides, which bring about a Beckmann transformation of the group

whereby probably ester-like compounds of the oximes, or esters of the enolic form of the corresponding acid amides of the above type are intermediately formed.

Compounds of this type may also be obtained by acylating mono-substituted acid amides, the latter reacting in their enolic form.

Triazoles are therefore in general obtained, for example, by treating oxime esters, for example the benzene sulphonic acid esters of the oximes, with acyl hydrazines under conditions under which the esters undergo Beckmann transformation to the imido ester of the corresponding secondary acid amide. Further, triazoles may also be obtained by subjecting oximes to the Beckmann transformation with the aid of acid halogenides, such as phosphorus pentachloride, phosphorus oxychloride and the like and by causing acyl hydrazines to react with the reaction product. The same imido compounds and therefore also the triazoles may be obtained from mono-substituted acid amides by acylating the same in their enolic form, for example by treating the mono-substituted acid amides with acid halogenides, such as acid chlorides, and then causing an acyl hydrazine to react with the reaction product.

The reaction takes place according to the following equations:

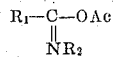

The residue X of the imido compound is first eliminated with a hydrogen atom of the primary amino group of the acyl hydrazine and then the 1,2,4-triazole is formed by the elimination of water from the resulting primary hydrazidine.

Depending on the nature of the starting materials employed, the triazole is spontaneously formed under the conditions of the reaction by the elimination of water or the acyl hydrazine, which may, on occasion, be capable of being isolated, is converted into the triazole by heating.

The reaction components may be caused to react with one another in solution or in suspension or in certain cases even without the use of solvents or dispersing agents. The reaction components may be employed in molecular proportions, or, if desired, an excess of one of the components, for example the acyl hydrazine, may be employed. The conversion is preferably effected in the presence of an inert organic solvent, such as chloroform, benzene, alcohol or the like, or of a mixture of solvents, water, on occasion, being also present.

The temperatures employed for the conversion may vary within wide limits, depending on the nature of the substances present. The operation may be effected both at comparatively low temperature ranges, for example those as low as $-10°$ C., or also at ordinary or at increased temperature, under certain circumstances even at temperatures far above $100°$ C.

In many cases, for example when employing the reaction components in the form of emulsions, it is advisable to promote the process of the reaction in a desired manner or to accelerate the same by the use of suitable, if necessary powerful, stirring apparatus.

The sequence, in which the reaction components are cause to react upon one another, may vary according to the conditions. Thus, for example, starting with oxime esters, the Beckmann transformation may be effected under suitable temperature conditions after the introduction of the acyl hydrazine.

On treating oximes or mono-substituted acid amides with acid halogenides, such as phosphorus oxychloride, phosphorus pentachloride, benzene sulphonic chloride, thionyl chloride and the like, the operation is in general with advantage effected in the presence of basic-reacting substances particular organic bases, such as pyridine and the like.

The process according to this invention enables 1,2,4-triazoles to be prepared in good yield, whereas the known processes for preparing triazoles by heating di-acyl hydrazines or mono-acyl hydrazines with acid amides to elevated temperatures (180–300° C.) (Meyer Jacobson, Lehrbuch der organischen Chemie, 1915/20, vol. 2, part 3, page 592) only give yields of 10–15% of theory. (cf. Chem. Centr. 1901 II, page 124 and Chem. Centr. 1911 II, page 1936.)

The following examples serve to illustrate how the invention may be carried into effect.

1. 36 grms. of methyl acetamide are dissolved in a mixture of 200 grms. of pyridine and 300 grms. of chloroform, after which 76.5 grms. of phosphorus oxychloride diluted with 75 grms. of chloroform are added drop by drop whilst cooling to about $0°$ C. After allowing to stand for some time the solution containing the lactim ester is introduced with stirring into a solution of 68 grms. of benzoyl hydrazine in 520 grms. of chloroform. After allowing to stand for some time water is added the solution neutralized and evaporated down, the residue extracted by boiling with chloroform and, after evaporating off the solvent, distilled. The product which consists of 3,4-dimethyl-5-phenyl-1,2,4-triazole is very readily soluble in water. On crystallizing from a mixture of benzene and benzine crystals having a melting point of $137°$ C. and a boiling point of $251°$ C. (at 14 mm.) are obtained. The reaction is probably as follows:

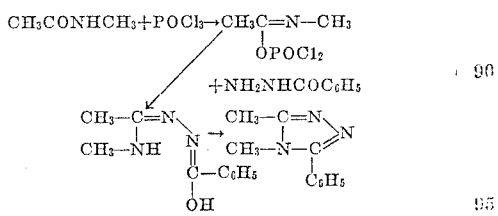

2. 34 grms. of acetophenone oxime (¼ mol) and 11 grms. of caustic soda are dissolved in 150 ccs. of water and 150 ccs. of chloroform and 45 grms. of benzene sulphonic acid chloride (¼ mol) introduced drop by drop at $-5°$ C. The mixture is esterified for 1 hour at $-2°$ C., then acidified and the chloroform solution of the ester separated. 22 grms. of propionyl hydrazine (¼ mol) dissolved in 50 ccs. of chloroform are added to the ester solution and converted at 20-25° C. After neutralizing the chloroform solution, the solution is evaporated down and the residue distilled. A satisfactory yield of 3-methyl-4-phenyl-5-ethyl-1,2,4-triazole is obtained. The latter comes over at 213–214° C. under 13 mm. pressure, crystallizes from benzene-benzine with a melting point of 152° C. and is readily soluble in water.

3. A solution of 61 grms. of thionyl chloride in 75 ccs. of chloroform is added drop by drop with cooling to 0° C. to a solution of 34 grms. of acetophenone oxime in 110 grms. of chloroform, whereby esterification and conversion take place. After standing for a short time the solution is carefully introduced with slight cooling into a solution of 22 grms. of propionyl hydrazine in 150 grms. of chloroform. After the reaction has proceeded for some time the reaction product is decomposed with water and the resulting triazole isolated. 3-methyl-4-phenyl-5-ethyl-1,2,4-triazole of melting point 152° C., which is chemically identical with the product obtained according to Example 2, is obtained.

4. 28 grms. of acetanilide (0.2 mol) are dissolved in 200 ccs. of chloroform and treated whilst cooling with 42 grms. (0.2 mol) of powdered phosphorus pentachloride. The phosphorus pentachloride goes completely into solution without any substantial evolution of hydrochloric acid gas. After about ½ an hour 18 grms. (½ mol) of propionyl hydrazine dissolved in 100 ccs. of chloroform are added with slight cooling. This temperature is maintained about 20° C. After standing for 2 hours the mixture is warmed for a short time to 45° C. whereupon slight hydrochloric acid gas evolution takes place. In order to destroy the phosphorus oxychloride, water and caustic soda solution are added with cooling until the solution reacts alkaline to phenol phthalein. The consumption of alkali amounts to about 57 grms. of caustic soda solution 100% of theory.

A portion of the reaction product, consisting of hydrazidine is precipitated from the chloroform solution in the form of thin needles. After careful re-crystallization from alcohol it has a melting point of 152–153° C., is soluble in water and with difficulty soluble in chloroform. On heating to 160° C. the hydrazidine is quantitatively converted into the 3-methyl-4-phenyl-5-ethyl-1,2,4-triazole which boils at 219° C. under 15 mm. pressure and crystallizes from benzene-benzine with a melting point of 152–153° C. The reaction is:

$$C_6H_5NHCOCH_3 + PCl_5 \rightarrow C_6H_5N{=}C{-}CH_3$$

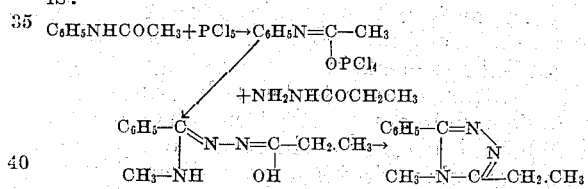

A portion of the hydrazidine is already converted during the reaction of the subsequent operations into the triazole and remains dissolved in chloroform. The yield of pure triazole amounts to 70–80% of theory. The reaction product is identical with that obtained according to Example 2 from acetophenone oxime.

5. 30 grms. of formanilide are dissolved in 40 grms. of pyridine and 150 grms. of chloroform and 45 grms. of benzene sulphonic chloride carefully added at −10° to −15° C. After the reaction has taken place for a short time the solution is introduced at −10° C. into a solution of 19 grms. of acetyl hydrazine and 100 ccs. of absolute alcohol. After the completion of the reaction the mixture is treated with water, neutralized and evaporated. The residue is extracted with chloroform. On evaporating the chloroform and distilling the chloroform extract 3-methyl-4-phenyl-1,2,4-triazole is obtained. The product purified by forming the picrate boils at 187° C. under 5 mm. pressure. The same triazole may be obtained by causing the imido ester of acetaniline to react with formyl hydrazine.

6. 35 grms. of acetocyclohexylamine are dissolved in a mixture of 40 grms. of pyridine and 120 grms. of chlorofrom and treated at 20–25° C. with 45 grms. of benzene sulphonic chloride. After completion of the conversion the solution containing the imido ester is introduced at 30–40° C. into a solution of 29 grms. of isovaleryl hydrazine and 150 grms. of chloroform. After the reaction has taken place for some time aqueous alkali is added. The hydrazidide formed may be isolated in a manner similar to that described in Example 9. The hydrazidine, which has a melting point of 196° C., splits off water on heating and is converted into the 3-methyl-4-cyclohexyl-5-isobutyl-1,2,4-triazole which may be distilled in vacuo. This product has a boiling point of 163° C. at 0.2 mm. From aqueous solution it is precipitated by the addition of sodium chloride as the hydrate, which may be re-crystallized from ether as crystals have a melting point of 67° C. The reaction is as follows:

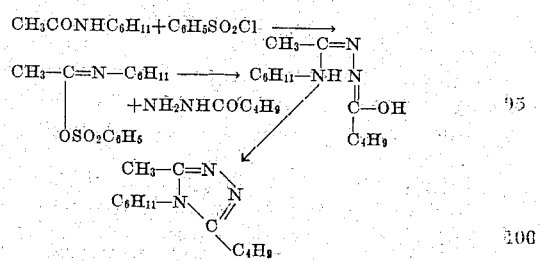

7. 40 grms. of aceto-m-xylidine are dissolved in a mixture of 40 grms. of pyridine and 75 grms. of chloroform and treated at about 30–40° C. with 45 grms. of benzene sulphonic chloride. After completion of the esterification the solution is introduced into a solution of 25,5 grms. of isobutyryl hydrazine and 150 grms. of chloroform. The mixture is worked up as described in Example 9. 3-methyl-4-m-xylyl-5-isopropyl-1,2,4-triazole may be obtained from the resulting hydrazidine of melting point 196° C. by the elimination of water. The product has a boiling point of 182° C. and a melting point of 80° C. and is readily soluble in water.

8. 100 grms. of the p-toluol sulphonic acid ester of cyclohexanone oxime are dissolved in 250 ccs. of chloroform and treated with 33 grms. of acetyl hydrazine (120% of theory). The solution is gently warmed up to the conversion temperature of the oxime ester and then cooled to a temperature not exceeding 45° C. The mixture is finally heated until the chloroform boils. The chloroform solution is shaken with potassium carbonate solution in order to remove the toluol sulphonic acid, the chloroform solution evaporated and the residue re-crystallized from water. 70–80% of theory of 4,5-pentamethylene-3-methyl-1,2,4-triazole is obtained as the hydrate having a melting point of 62° C. The setting point of the anhydrous product is 111–112° C. and the boiling point 210° C. at 10 mm. This triazole is easily soluble in chloroform and alcohol and also crystallizes very readily from acetic ester and acetone and is with difficulty soluble in ether and petroleum ether. The reaction is:

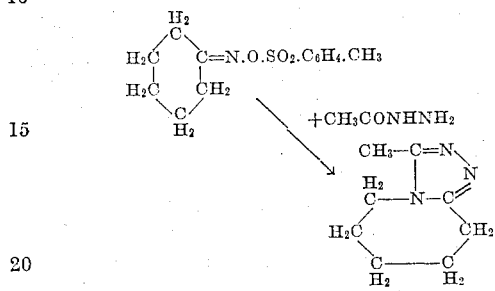

9. 127 grms. of o-N-methylcyclohexanone oxime and 44 grms. of sodium hydroxide are dissolved in 350 ccs. of water. After adding 100 ccs. of benzene 176 grms. of benzene sulphonic chloride are added drop by drop with cooling and vigorous stirring. At the end of the reaction 200 ccs. of chloroform are added, the solution of the ester separated from the aqueous liquid and dried under cooling. The ester solution is then introduced at 60–65° C., drop by drop with slow stirring into a solution of 130 grms. of diethyl-acetyl hydrazine and 250 ccs. of chloroform. At the end of the conversion water is added and the solution neutralized with alkali. The chloroform and benzene are removed by evaporation. After cooling the hydrazidine formed separates out from the aqueous solution. It may be purified by dissolving in acid and precipitating with alkali. It crystallizes from alcohol in the form of needles having a melting point of 205° C. The dried hydrazidine is heated in an oil bath to a temperature above its melting point, whereby water is eliminated and the hydrazidine is converted into the diethyl-C-1,2,4-triazole of the methyl-ε-leucine lactam. This triazole boils at 170° C. under 0.5 mm. pressure. From water it crystallizes as the hydrate.

10. 4.6 grms. of benzene sulphonic chloride are slowly added whilst cooling to about 0° C. to a solution of 28.5 grms. of ε-leucine lactam in a mixture of 40 grms. of pyridine and 110 grms. of chloroform. After allowing to stand for about ½ an hour at 0° C. the solution of the lactim ester is introduced into a solution of 29 grms. of isovaleryl hydrazine in 150 grms. of chloroform. After decomposing with water and neutralizing, the solution is evaporated down, extracted with chloroform and the chloroform residue distilled. A good yield of 3,4-pentamethylene-5-isobutyl-1,2,4-triazole, having a melting point of 50° C. and a boiling point of 183° C. at 0.4 mm., is obtained. The product is very hygroscopic and very readily soluble in water and organic solvents. The reaction is:

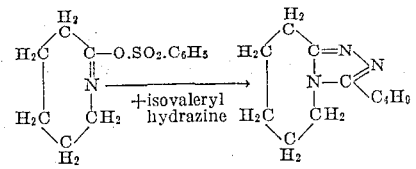

11. 22.5 grms. of phenyl-benzimido-ethyl ether are mixed with 9 grms. of acetyl hydrazine and heated in an oil bath for several hours to about 150° C. After cooling the solid hard mass is triturated with ether and then with water, dissolved in dilute acid and the resulting triazole precipitated with alkali. 3,4-diphenyl-5-methyl-1,2,4-triazole is obtained and may be crystallized from a mixture of benzene and benzine as crystals having a melting point of 163° C. The same triazole can also be obtained from the benzene sulphonic acid ester of acetophenone oxime by conversion with benzhydrazine as well as from the benzene sulphonic acid ester of benzophenone oxime and acetyl hydrazine by conversion of the oxime ester in the presence of the acyl hydrazine.

The term "acid halogenides" in the specification and in the claims is to be understood to include both inorganic acid halogenides, such as phosphorus pentachloride, thionyl chloride, and the like, as well as the halogenides of strong organic acids such as benzol or toluol sulphonic chloride and the like. The imido compounds employed as starting materials in the process according to this invention are to be understood to include both in the specification and claims also such imido compounds in a non-isolated form, for example in the form of non-isolated intermediate or unstable intermediate products.

What we claim is:—

1. A process for preparing 1,2,4-triazoles wherein acyl hydrazines of the type—

where Ac represents an acyl radical, are caused to react with imido compounds of the type—

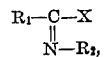

wherein $R_1$ and $R_2$ are each an alkyl or aryl radical, and wherein X is any radical which is capable of mutually reacting with one of the hydrogen atoms of the acyl hydrazines.

2. A process as claimed in claim 1 wherein the acyl hydrazines are caused to react with imido esters of the type characterized in claim 1.

3. A process as claimed in claim 1, wherein the acyl hydrazines are caused to react with the products of the Beckmann transformation of ketoximes.

4. A process as claimed in claim 1, wherein the acyl hydrazines are caused to react with the products of the Beckmann transformation of sulphonic acid esters of ketoximes.

5. A process as claimed in claim 1, wherein the acyl hydrazines are caused to react with the reaction products of inorganic acid halogenides with secondary acid amides.

6. A process as claimed in claim 1, wherein the acyl hydrazines are caused to react with the products of the reaction of inorganic acid chlorides with secondary acid amides in the presence of basic substances.

7. A process as claimed in claim 1, wherein the acyl hydrazines are caused to react with the products of the reaction of inorganic acid chlorides with secondary acid amides in the presence of pyridine.

8. A process as claimed in claim 1, wherein the acyl hydrazines are caused to react with the products of the reaction of organic sulphonic acid chlorides with secondary acid amides in the presence of basic substances.

9. A process as claimed in claim 1, wherein the acyl hydrazines are caused to react with the products of the reaction of organic sulphonic acid chlorides with secondary acid amides in the presence of pyridine.

10. A process as claimed in claim 1, wherein the acyl hydrazines are caused to react with imido ethers of the type—

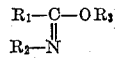

wherein $R_1$, $R_2$ and $R_3$ are each an alkyl or aryl residue.

11. A process as claimed in claim 1, wherein the reaction of the acyl hydrazines is effected in the presence of inert organic solvents.

12. As a new product: 3-methyl-4-xylyl-5-isopropyl-1,2,4-triazole.

In testimony whereof we affix our signatures.

Dr. GEORG SCHEUING.
Dr. BRUNO WALACH.